United States Patent
Barsness et al.

(10) Patent No.: US 9,958,979 B1
(45) Date of Patent: May 1, 2018

(54) WEB SERVER THAT RENDERS A WEB PAGE BASED ON A CLIENT PRESSURE PROFILE

(71) Applicant: International Business Machines Corporation, Armonk, NY (US)

(72) Inventors: Eric L. Barsness, Pine Island, MN (US); Jay S. Bryant, Rochester, MN (US); James E. Carey, Rochester, MN (US); Joseph W. Cropper, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/339,455

(22) Filed: Oct. 31, 2016

(51) Int. Cl.
| | |
|---|---|
| *G06F 3/0487* | (2013.01) |
| *G06F 17/30* | (2006.01) |
| *H04L 29/08* | (2006.01) |
| *G06F 3/041* | (2006.01) |
| *H04L 29/06* | (2006.01) |
| *G06F 3/01* | (2006.01) |

(52) U.S. Cl.
CPC ............ *G06F 3/0414* (2013.01); *H04L 67/02* (2013.01); *H04L 67/306* (2013.01); *H04L 67/42* (2013.01); *G06F 3/017* (2013.01); *G06F 3/0487* (2013.01)

(58) Field of Classification Search
CPC .... G06F 3/0488; G06F 3/0414; G06F 3/0487; H04L 67/02; H04L 67/22
USPC .......................................... 715/702; 345/174
See application file for complete search history.

(56) References Cited

U.S. PATENT DOCUMENTS

| | | | |
|---|---|---|---|
| 8,519,971 B1 * | 8/2013 | Mackraz | G06F 3/147 313/504 |
| 9,405,400 B1 * | 8/2016 | Khafizov | G06F 3/0418 |
| 2002/0005108 A1 * | 1/2002 | Ludwig | G10H 1/00 84/600 |
| 2006/0132456 A1 | 6/2006 | Anson | |

(Continued)

FOREIGN PATENT DOCUMENTS

KR    101577277 B1    12/2015

OTHER PUBLICATIONS

Appendix P—List of IBM Patents or Patent Applications Treated as Related, dated Nov. 10, 2016.

(Continued)

*Primary Examiner* — Andrew Tank
(74) *Attorney, Agent, or Firm* — Martin & Associates, LLC; Derek P. Martin

(57) ABSTRACT

A web server includes a pressure-sensitive page rendering mechanism that renders web pages that have one or more selectable inputs according to a client pressure profile corresponding to the requesting user. When the web server receives the request, the web server may dynamically generate and render a web page that satisfies the client pressure profile by placing one or more selectable inputs on the web page in one or more preferred regions of the touch screen display. In the alternative, the web server may have multiple versions of a web page that correspond to multiple different server pressure profiles, and when a web page is requested, the web server identifies a server pressure profile that corresponds to the client pressure profile, identifies a web page that corresponds to the identified server pressure profile, then renders the web page to the user's device.

19 Claims, 8 Drawing Sheets

(56) References Cited

U.S. PATENT DOCUMENTS

| | | |
|---|---|---|
| 2008/0289885 A1 | 11/2008 | Elwell et al. |
| 2014/0208248 A1 | 7/2014 | Davidson |
| 2014/0229848 A1 | 8/2014 | Zhang et al. |
| 2015/0084873 A1 | 3/2015 | Hagenbuch et al. |
| 2015/0301671 A1* | 10/2015 | Fan ..................... G06F 3/0414 715/762 |
| 2016/0188181 A1* | 6/2016 | Smith .................... G06F 3/048 715/765 |
| 2016/0378255 A1 | 12/2016 | Butler et al. |
| 2017/0024074 A1 | 1/2017 | Forlines et al. |

OTHER PUBLICATIONS

Appendix P—List of IBM Patents or Patent Applications Treated as Related, dated Mar. 15, 2017.
Appendix P—List of IBM Patents or Patent Applications Treated as Related, dated Jul. 15, 2017.
Barsness et al., "Pressure-Sensitive Touch Screen Display and Method", U.S. Appl. No. 15/277,121, filed Sep. 27, 2016.
Barsness et al., "Pressure-Sensitive Touch Screen Display and Method", U.S. Appl. No. 15/339,370, filed Oct. 31, 2016.
Barsness et al., "Automatic Generation of a Client Pressure Profile for a Touch Screen Device", U.S. Appl. No. 15/457,594, filed Mar. 13, 2017.
Barsness et al., "Pressure-Sensitive Touch Screen Display and Method", U.S. Appl. No. 15/633,503, filed Jun. 26, 2017.
Barsness et al., "Pressure-Sensitive Touch Screen Display and Method", U.S. Appl. No. 15/693,412, filed Aug. 31, 2017.
Barsness et al., "Pressure-Sensitive Touch Screen Display and Method", U.S. Appl. No. 15/693,434, filed Aug. 31, 2017.
Appendix P—List of IBM Patents or Patent Applications Treated as Related, dated Sep. 27, 2017.

* cited by examiner

1110

| Server Pressure Profiles | Web Pages |
|---|---|
| Portrait, Right Hand, Small Hand | Page A Version 1 |
| Portrait, Left Hand, Small Hand | Page A Version 2 |
| Portrait, Right Hand, Large Hand | Page A Version 3 |
| Portrait, Left Hand, Large Hand | Page A Version 4 |
| Landscape, Both Hands, Small Hands | Page A Version 5 |
| Landscape, Both Hands, Large Hands | Page A Version 6 |

| Server Pressure Profiles | Web Pages |
|---|---|
| Portrait, Right Hand, Small Hand | Page B Version 1 |
| Portrait, Left Hand, Small Hand | Page B Version 2 |
| Portrait, Right Hand, Large Hand | Page B Version 1 |
| Portrait, Left Hand, Large Hand | Page B Version 2 |
| Landscape, Both Hands, Small Hands | Page B Version 3 |
| Landscape, Both Hands, Large Hands | Page B Version 3 |

FIG. 12

WEB SERVER THAT RENDERS A WEB PAGE BASED ON A CLIENT PRESSURE PROFILE

BACKGROUND

1. Technical Field

This disclosure generally relates to web servers, and more specifically relates to web servers that render web pages to devices with a pressure-sensitive touch screen display.

2. Background Art

Users interact with electronic devices that have touch screen displays, such as smart phones, in different ways. Most people use their fingers or thumbs most of the time, while some use a stylus. Apple, Inc. introduced a touch screen display in the Apple 6 phones that is pressure-sensitive, meaning a light touch on a pressure-sensitive graphic can cause a first action, a medium touch can cause a second action, and a heavy touch can cause a third action. This pressure-sensitive touch screen display is supported in the iOS 9 and iOS 10 by Apple that runs on Apple devices, and is called 3D Touch by Apple. 3D Touch is a trademark of Apple, Inc.

Different users use their devices in different manners. For example, some prefer to hold their phone in a portrait orientation, and scroll or select items on the screen with the thumb of the hand that is holding the phone. Some prefer to hold their phone in a landscape orientation, and scroll and select items on the screen with the thumbs of both hands. Two-handed operation is often preferred for typing text, such as when texting someone. Some prefer to use fingers instead of thumbs. People also use their devices in different orientations depending on the application they are using.

The different ways people use their devices may make using a pressure-sensitive touch screen somewhat difficult for some users. What a user intends to be a light touch could be interpreted as a medium touch. The orientation of the device comes into play, because a user holding a phone in portrait orientation in her right hand would likely produce different amounts of pressure depending on the location on the screen being touched. Thus, the user holding the phone in her right hand might touch an item close to the right edge with much less force than when touching an item in the middle or on the left edge of the screen. This is due to the anatomical features of a person's hands. Thus, a user may touch an item on the right side of the screen intending a medium touch, but the device recognizes the touch as a light touch, which is not what the user intended.

U.S. Ser. No. 15/277,121 filed on Sep. 27, 2016 discloses the creation of a pressure map on a device that includes a pressure-sensitive touch screen display, where the pressure map includes pressure detection thresholds for different regions of the pressure-sensitive touch screen display. U.S. Ser. No. 15/339,370 filed on Oct. 31, 2016 discloses defining one or more preferred screen regions on a device that includes a pressure-sensitive touch screen display, and when a pressure-sensitive input is located in a less preferred screen region, the pressure-sensitive input can be either relocated to be within a preferred screen region, or may be enlarged and remain in a less preferred screen region. The device itself changes how a display of information, such as a web page, is presented to the user based on a pressure map corresponding to the user, thereby improving the usability of the device for the user. These two patent applications referenced above make needed changes at the device itself, assuming web pages are rendered as is known in the prior art.

SUMMARY

A web server includes a pressure-sensitive page rendering mechanism that renders web pages that have one or more selectable inputs according to a client pressure profile corresponding to the user who requested the web page from the web server. When the web server receives the request from the client, the web server may dynamically generate and render a web page that satisfies the client pressure profile by placing one or more selectable inputs on the web page in one or more preferred regions of the touch screen display. In the alternative, the web server may have multiple versions of a web page that correspond to multiple different server pressure profiles. When a user requests a web page using a device that has a pressure-sensitive touch screen display, the web server analyzes the client pressure profile, identifies a server pressure profile that corresponds to the client pressure profile, identifies a web page that corresponds to the identified server pressure profile, then renders the web page to the user's device. In this manner, the best version of a web page can be rendered to the user's device based on the client pressure profile.

The foregoing and other features and advantages will be apparent from the following more particular description, as illustrated in the accompanying drawings.

BRIEF DESCRIPTION OF THE DRAWING(S)

The disclosure will be described in conjunction with the appended drawings, where like designations denote like elements, and:

FIG. 11 is a table that shows a first example of web page versions that correspond to server pressure profiles;

FIG. 12 is a table that shows a second example of web page versions that correspond to server pressure profiles;

DETAILED DESCRIPTION

The disclosure and claims herein relate to a web server that includes a pressure-sensitive page rendering mechanism that renders web pages that have one or more selectable inputs according to a client pressure profile corresponding to the user who requested the web page from the web server. When the web server receives the request from the client, the web server may dynamically generate and render a web page that satisfies the client pressure profile by placing one or more selectable inputs on the web page in one or more preferred regions of the touch screen display. In the alternative, the web server may have multiple versions of a web page that correspond to multiple different server pressure profiles. When a user requests a web page using a device that has a pressure-sensitive touch screen display, the web server analyzes the client pressure profile, identifies a server pressure profile that corresponds to the client pressure profile, identifies a web page that corresponds to the identified server pressure profile, then renders the web page to the user's device. In this manner, the best version of a web page can be rendered to the user's device based on the client pressure profile.

Figure 1:
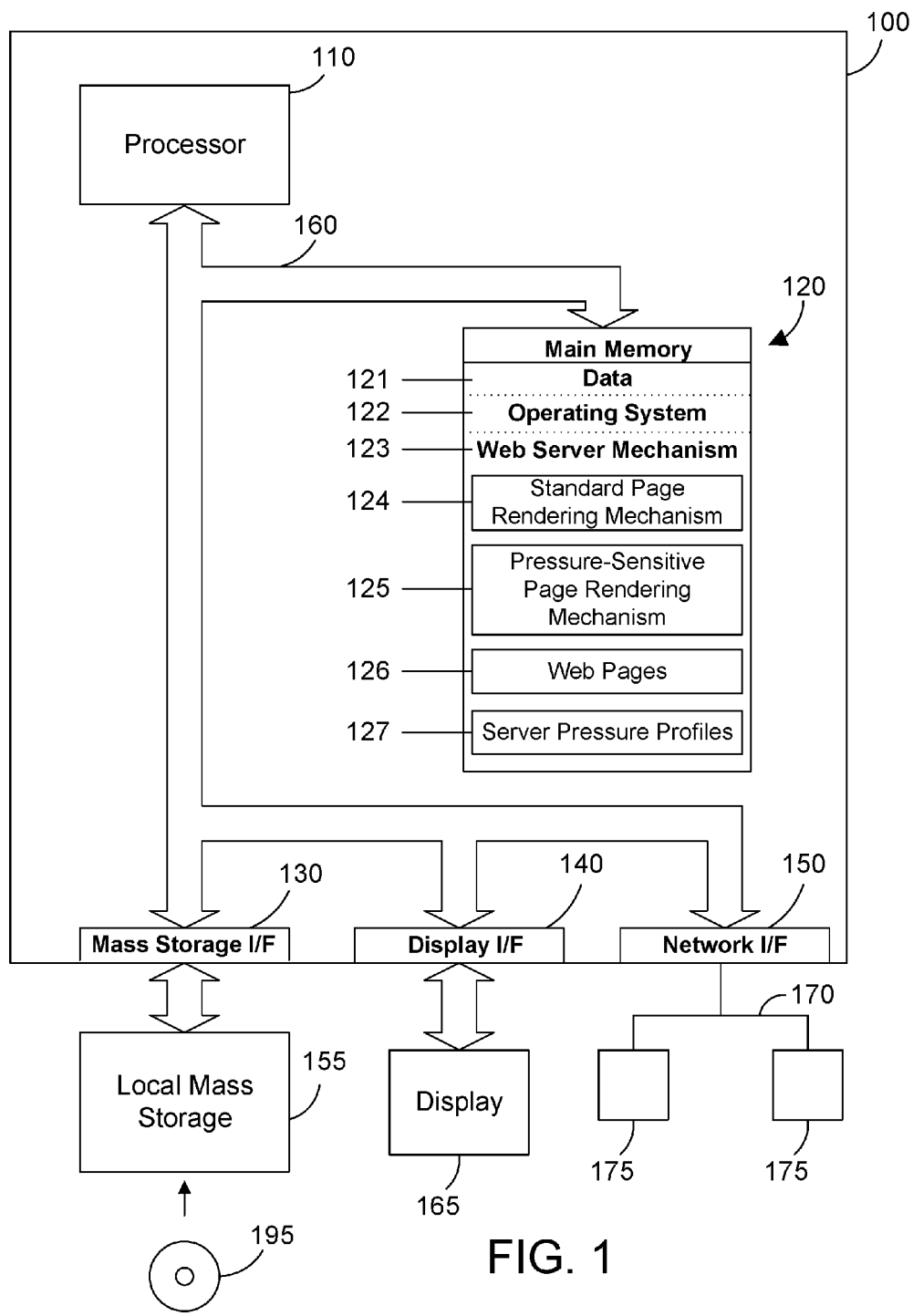
FIG. 1 is a block diagram of a web server computer system that includes a pressure-sensitive page rendering mechanism.

Referring to FIG. 1, a computer system 100 is one suitable implementation of a web server computer system that includes a pressure-sensitive page rendering mechanism as described in more detail below. Server computer system 100 is an IBM POWER8 computer system. However, those skilled in the art will appreciate that the disclosure herein applies equally to any computer system, regardless of whether the computer system is a complicated multi-user computing apparatus, a single user workstation, a laptop computer system, a tablet computer, a phone, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195. Another suitable type of local mass storage device 155 is a card reader that receives a removable memory card, such as an SD card, and performs reads and writes to the removable memory. Yet another suitable type of local mass storage device 155 is a thumb drive.

Main memory 120 preferably contains data 121, an operating system 122, and a web server mechanism 123. Data 121 represents any data that serves as input to or output from any program in computer system 100. Operating system 122 is a multitasking operating system, such as AIX or LINUX. The web server mechanism 123 is software that receives requests for web pages from client devices, and in response, renders web pages to the client devices. The web server mechanism 123 includes a standard page rendering mechanism 124, a pressure-sensitive page rendering mechanism 125, web pages 126, and may optionally include server pressure profiles 127. The standard page rendering mechanism 124 represents a page rendering mechanism as known in the art. The standard page rendering mechanism 124 can render web pages to a requesting device. For example, the standard page rendering mechanism 124 may render a first version of a page to a user's laptop computer system, but when the user is using a mobile device such as a smart phone, the standard page rendering mechanism 124 renders a different version of the page to the user's smart phone. It is known in the art to provide both non-mobile versions of web pages and mobile versions of web pages, because the smaller screens on mobile devices create an environment where displaying the same page designed for a large display will not work well on a small display, because the text will be difficult to read and the selectable items like icons and links will be too small to easily select with the tip of a finger or thumb.

The pressure-sensitive page rendering mechanism 125 is software that renders web pages to devices that have a pressure-sensitive touch screen display. In the prior art, web servers render the same page to devices that have a pressure-sensitive touch screen display as devices that don't. Thus, when a user with a smart phone requests a web page, known web servers render the mobile version of the page, without knowing or caring whether or not the device has a pressure-sensitive touch screen display. The pressure-sensitive page rendering mechanism 125 determines when a requesting device has a pressure-sensitive touch screen display, and renders pages to devices that have a pressure-sensitive touch screen display. Thus, when a user of a smart phone without a pressure-sensitive touch screen display requests a web page from the web server 100, the standard page rendering mechanism 124 will return the standard mobile version of the requested web page to the user's smart phone. In contrast, when a user of a smart phone with a pressure-sensitive touch screen display requests a web page from the web server 100, the pressure-sensitive page rendering mechanism 125 renders a page that is better suited to the pressure-sensitive touch screen display, as discussed in more detail below.

Web pages 126 may include multiple versions of web pages, such as standard and mobile, and may additionally include multiple versions for devices that have pressure-sensitive displays. In one suitable implementation, web pages for devices that have pressure-sensitive displays correspond to one or more of the server pressure profiles 127. The server pressure profiles 127 are profiles that define certain characteristics that can be considered when rendering web pages to devices that have pressure-sensitive interfaces, as described in more detail below. In one suitable implementation, each server pressure profile has a corresponding web page version. This allows the proper web page to be rendered when a user of a device with a pressure-sensitive touch screen display requests a web page from the web server computer system 100.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, and web server mechanism 123 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120.

Main memory 120 stores programs and data that processor 110 may access. When computer system 100 starts up, processor 110 initially executes the program instructions that make up operating system 122. Processor 110 also executes the web server mechanism 123 under control of the operating system 122.

Although computer system 100 is shown to contain only a single processor and a single system bus, those skilled in the art will appreciate that a pressure-sensitive page rendering mechanism as described herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Computer systems 175 represent computer systems that are connected to the computer system 100 via the network interface 150 in a computer cluster. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allows communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150. In one suitable implementation, the network interface 150 is a physical Ethernet adapter.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
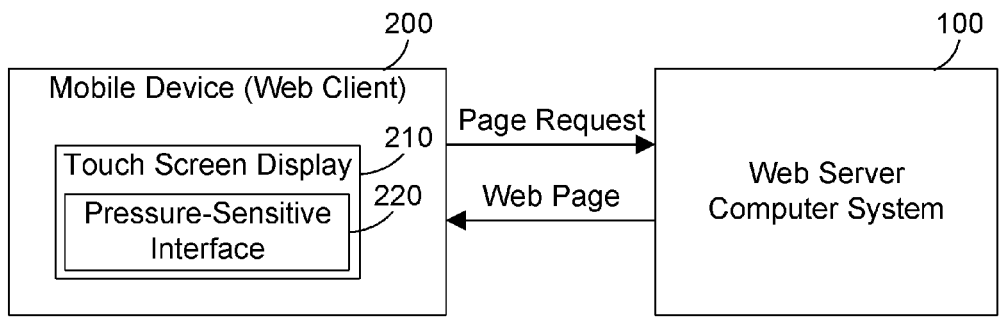
FIG. 2 is a block diagram showing interaction between a mobile device that includes a touch screen display with a pressure-sensitive interface and a web server computer system.

Referring to FIG. 2, a block diagram shows how a mobile device 200 interacts with a web server computer system 100, such as shown in FIG. 1. The mobile device 200 is a web client, and includes a touch screen display 210 with a pressure-sensitive interface 220. The mobile device 200 thus includes a pressure-sensitive touch screen display. The mobile device 200 could be any suitable mobile device, including without limitation a smart phone, tablet computer, laptop computer, network appliance, e-reader, or any other type of electronic equipment that can request a web page from a web server. As described in the Background section above, pressure-sensitive interfaces are known in the art. However, known prior art does not vary which pages are rendered to devices with pressure-sensitive touch screen displays compared to devices that do not have pressure-sensitive touch screen displays. The web server computer system disclosed and claimed herein determine when a web page request comes from a device with a pressure-sensitive touch screen display, and renders a web page that is better suited to the pressure-sensitive touch screen display.

Figure 3:
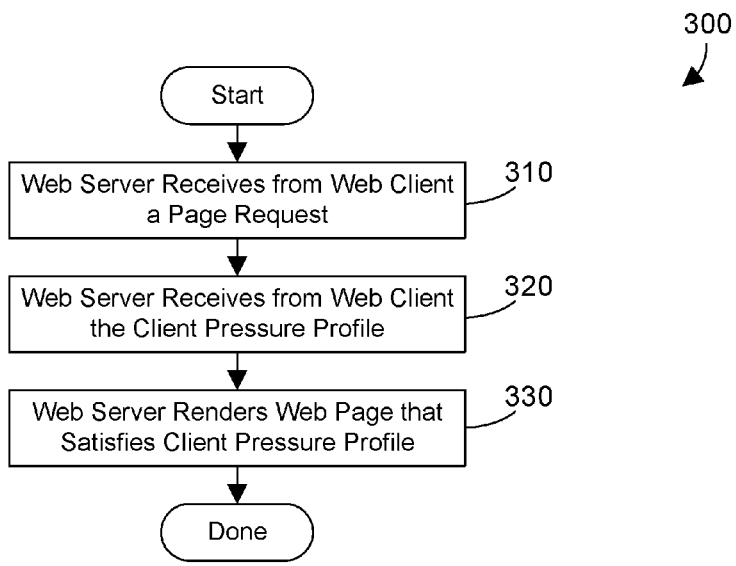
FIG. 3 is a flow diagram of a method for a web server to render a web page that satisfies a client pressure profile.

Referring to FIG. 3, a method 300 renders web pages to devices that are web clients and that have a touch screen display with a pressure-sensitive interface, such as device 200 shown in FIG. 2. The web server receives from the web client a page request (step 310). The web server also receives a client pressure profile from the web client (step 320). Note the client pressure profile in step 320 could be sent as part of the page request to the web server in step 310. In the alternative, the page request in step 310 may include a simple flag or other information that identifies the requesting device as a device that has a pressure-sensitive touch screen display. When the page request is made to a web server that supports rendering different versions of a web page according to a client pressure profile, the web server could then request the client pressure profile from the device, which then sends the client pressure profile as shown in step 320. Once the web server receives the page request and client pressure profile, the web server renders a web page that satisfies the client pressure profile (step 330). Method 300 is then done. The web page rendered in step 330 is preferably a version of a web page that is better suited to the user according to the client pressure profile.

Figure 4:
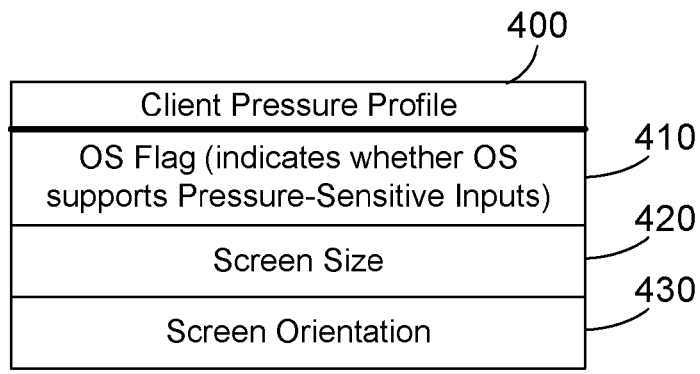
FIG. 4 is table showing examples of information that could be included in a client pressure profile.

Referring to FIG. 4, a table 400 shows information that could be included in the client pressure profile sent in step 320 in FIG. 3. A flag 410 could be included that indicates whether the operating system of the requesting device supports pressure-sensitive inputs. Screen size 420 and screen orientation 430 may also be included in the client pressure profile. Knowing the screen size and orientation allows the web server to render a version of the web page that is optimized for pressure sensitive input. For example, knowing the screen orientation may indicate to the web server whether the device is in a landscape orientation, and is therefore more likely being used with two thumbs, or is in a portrait orientation, and is therefore more likely being used with one thumb or one finger. In addition, knowing that the screen is large such as on a tablet computer may indicate a need to group selectable items such as pressure sensitive inputs closer to the corners of the screen than needed on a smaller screen.

Figure 5:
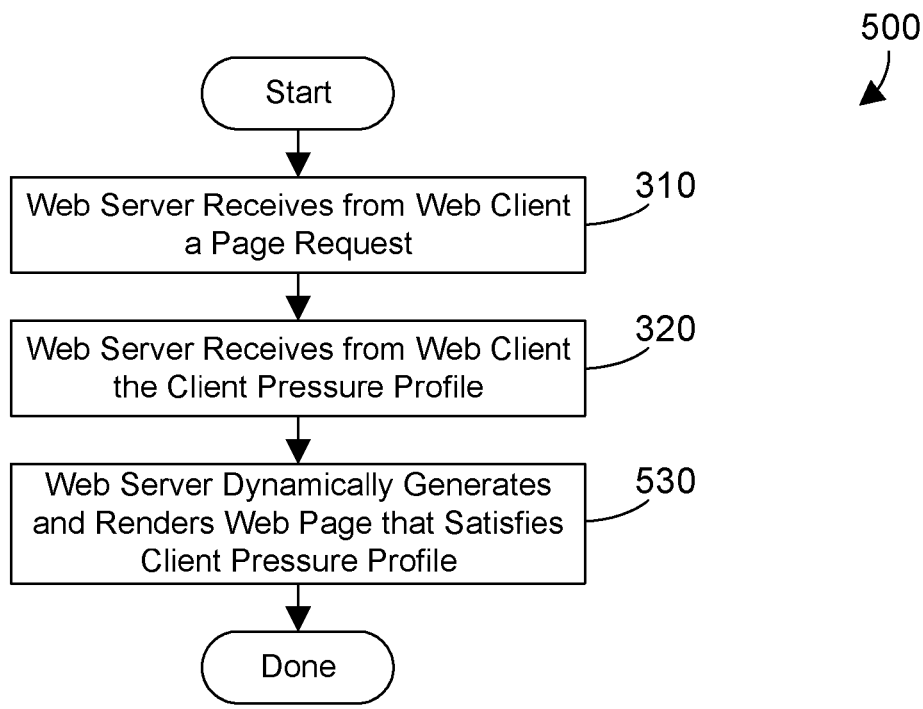
FIG. 5 is flow diagram of a method for a web server to dynamically generate and render a web page that satisfies a client pressure profile.

Referring to FIG. 5, a method 500 is a suitable example of a first implementation for method 300 shown in FIG. 3. Note that steps 310 and 320 in FIG. 5 are the same as steps 310 and 320 in FIG. 3. Once the web server has received the page request and client pressure profile from the web client, the web server dynamically generates and renders a web page that satisfies the client pressure profile (step 530). The dynamic generation of a web page in step 530 allows customizing a web page according to the client pressure profile, thereby allowing a user who has uncommon characteristics to receive a web page that was dynamically generated (i.e., custom-built) to satisfy the user's client pressure profile. For example, a person who is missing digits on one or both hands could have a client pressure profile that is less common than others. Method 500 accommodates such a user by dynamically generating a web page that satisfies the client pressure profile.

Figure 6:
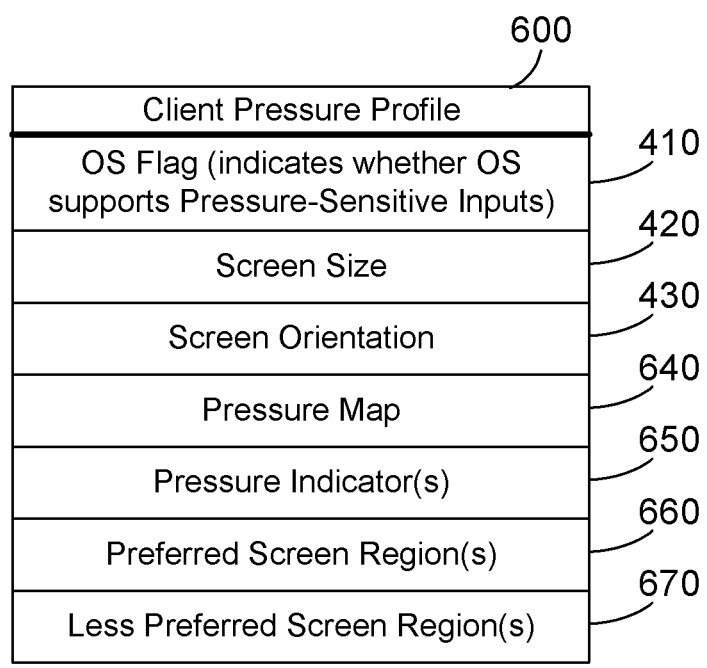
FIG. 6 is a table showing examples of information that could be included in a client pressure profile.
Figure 7:
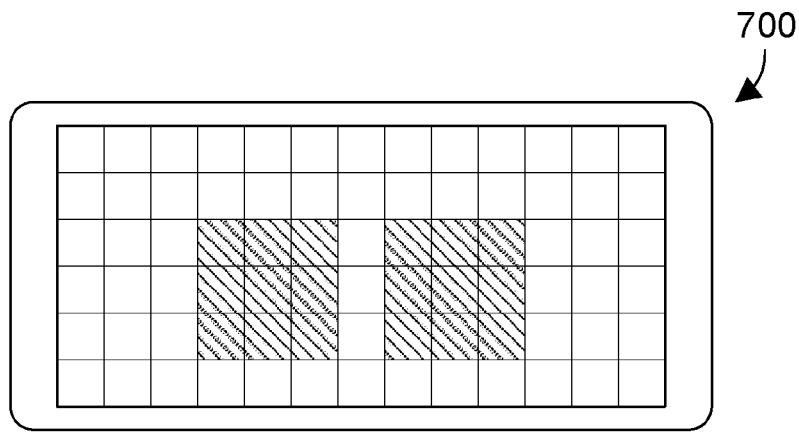
FIG. 7 is a diagram of a sample device in landscape orientation with two preferred screen regions.
Figure 8:
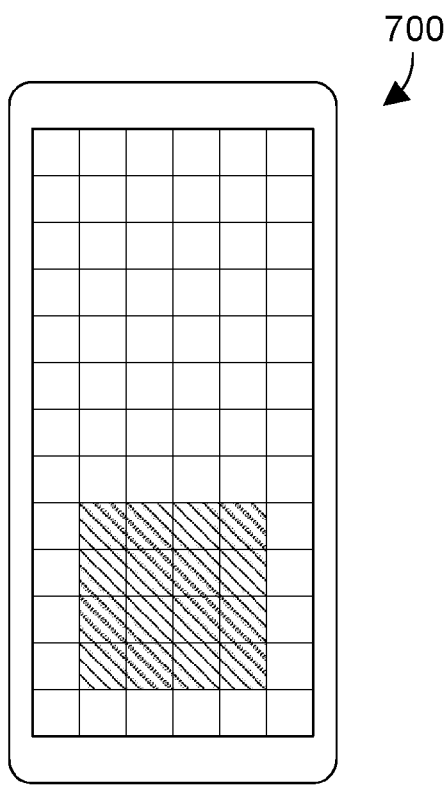
FIG. 8 is a diagram of the sample device in FIG. 7 in portrait orientation with one preferred screen region.

Referring to FIG. 6, a client pressure profile 600 is shown with the same information 410, 420 and 430 shown in FIG. 4, but may additionally include a pressure map 640, one or more pressure indicators 650, one or more preferred screen regions 660, and one or more less preferred screen regions 670. The pressure map 640 is preferably a map of the touch screen display of the device that is acting as a web client, and may include multiple pressure thresholds that define different actions for the device. Pressure map 640 could be similar to the pressure map generated in U.S. Ser. No. 15/277,121 filed on Sep. 27, 2016, which includes pressure detection thresholds for different regions of a pressure-sensitive touch screen display on the device. The client pressure profile 600 could include one or more pressure indicators 650 that characterize how the user uses the device. For example, a pressure indicator for a landscape orientation may be "two thumbs" while a pressure indicator for a portrait orientation may be "one thumb." A pressure indicator may also indicate the hand size of the user, and whether the user uses a right, hand, left hand, or both. In addition, the pressure indicator(s) 650 could identify characteristics for the current orientation of the device, and would change when the orientation of the device changes. Preferred screen regions 660 could include one or more regions of the touch screen display that are preferred for displaying selectable items, such as icons and links, which may be pressure-sensitive inputs when displayed on a pressure-sensitive touch screen display. Less preferred screen regions 670 could include one or more regions of the touch screen display that are less preferred for displaying selectable items. In one suitable implementation, the less preferred screen regions 670 are all regions of the touch screen display that are not in the preferred screen regions 660. For example, preferred screen regions 660 for the device 700 in FIG. 7 in landscape orientation are the two shaded regions in FIG. 7, with everything outside of the shaded regions in FIG. 7 being a less preferred screen region 670. In another example, preferred screen regions 660 for the device 700 in FIG. 8 in portrait orientation are the shaded region in FIG. 8, with everything outside of the shaded region in FIG. 8 being a less preferred screen region 670. Note the information in the client pressure profile 600 in FIG. 6 is shown as examples of information that could be included in a client pressure profile, and a client pressure profile need not include all the information shown in FIG. 6. For example, the pressure map 640 could be included in the client pressure profile 600 without the preferred screen regions 660 and less preferred screen regions 670, because a web server could determine which regions of the display are preferred and less preferred from the pressure map 640. In another example, the client pressure profile 600 could include preferred screen regions 660 without the pressure map 640 and the less preferred screen regions 670. One skilled in the art will appreciate a client pressure profile can include any suitable information relating to a user's device that can be used in determining a corresponding web page to render to the user's device.

Figure 9:
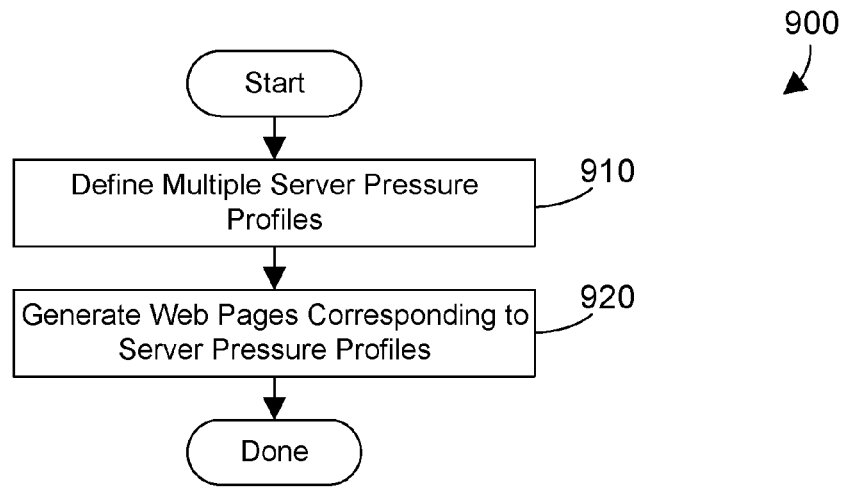
FIG. 9 is a flow diagram of a method for generating web pages that correspond to server pressure profiles.

It may not be desirable to impose on the web server the requirement to dynamically generate a web page, as shown in step 530 in FIG. 5. In a second implementation, instead of dynamically generating a web page, multiple versions of a web page are provided according to defined server pressure profiles. Referring to FIG. 9, method 900 begins by defining multiple server pressure profiles (step 910). Each server pressure profile preferably characterizes how a user uses a device. The server pressure profiles defined in step 910 preferably correspond to the server pressure profiles 127 shown in FIG. 1. Web pages are then generated corresponding to the defined server pressure profiles (step 920). While there may be a one-to-one correspondence between server pressure profiles defined in step 910 and web pages generated in step 920, it is also within the scope of the disclosure and claims herein to generate one web page that corresponds to multiple server pressure profiles.

Figure 10:
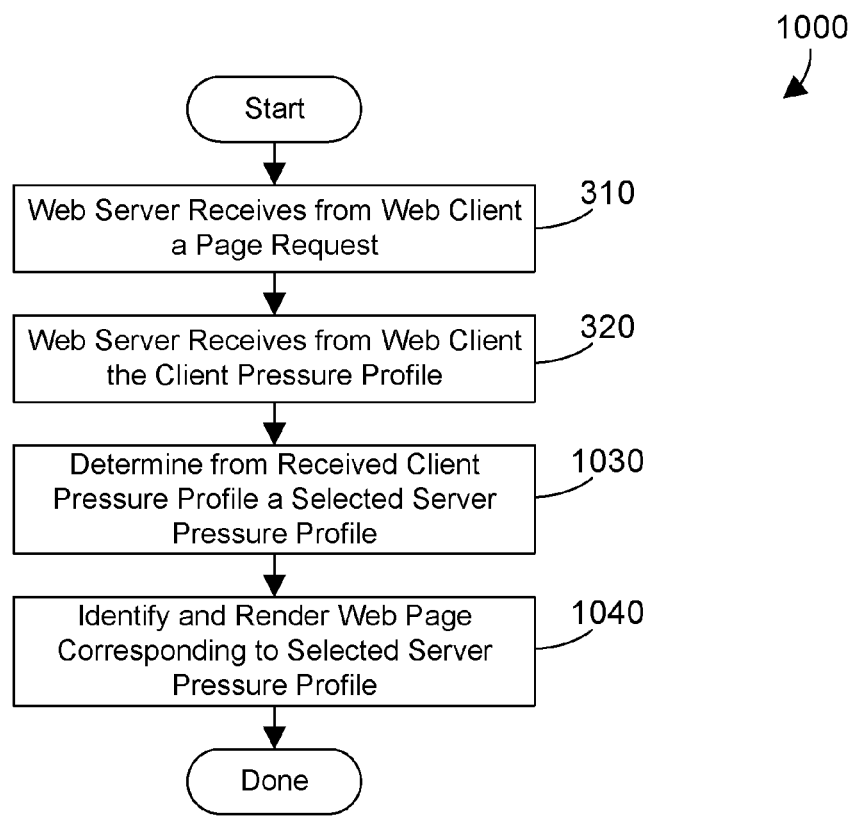
FIG. 10 is a flow diagram of a method for rendering a web page from multiple versions of a web page according to a client pressure profile.

Referring to FIG. 10, a method 1000 is another suitable example of a first implementation for method 300 shown in FIG. 3. Note that steps 310 and 320 are the same as shown in FIG. 3. Once the page request and client pressure profile are received from the web client, the web server determines a selected server pressure profile that corresponds to the received client pressure profile (step 1030). This determination may be made in any suitable way. In one specific implementation, the server pressure profiles specifically correspond to information in the client pressure profile 600, such as pressure indicators 650. A web page corresponding to the selected server profile is then identified and rendered (step 1040). Method 1000 is then done.

In one specific implementation, the server pressure profiles defined in step 910 in FIG. 9 correspond to pressure indicators, such as 650 in FIG. 6, in a client pressure profile. Thus, when the web server receives the client pressure profile, the web server can readily identify which server pressure profile corresponds to the pressure indicators in the client pressure profile, and can then render a web page that corresponds to the pressure indicators, and is therefore suited for the client pressure profile.

Examples are shown in FIGS. 11-14 to illustrate the concepts in FIGS. 9 and 10. Table 1110 in FIG. 11 shows the correspondence between server pressure profiles and web pages. We assume the server has the following six pressure profiles defined:

Portrait, Right Hand, Small Hand
Portrait, Left Hand, Small Hand
Portrait, Right Hand, Large Hand
Portrait, Left Hand, Large Hand
Landscape, Both Hands, Small Hands
Landscape, Both Hands, Large Hands These server pressure profiles are shown in the left column of table 1110 in FIG. 11. Corresponding versions of the web page A are shown in the right column of table 1110 in FIG. 11. The example in FIG. 11 assumes a different version of web page A is generated and stored for each of the six server pressure profiles. When a client pressure profile is received, the web server determines which of the six server pressure profiles best corresponds to the received client pressure profile, then renders the corresponding page. In the simplest example, the information in the client pressure profile will allow an exact match with a corresponding server pressure profile. Thus, we assume the client pressure profile 600 in FIG. 6 includes pressure indicators 650 that identify the client pressure profile as corresponding to one of the six defined server pressure profiles in FIG. 11. In this simple case, the web server reads the client pressure profile, identifies from the information in the client pressure profile the corresponding server pressure profile, and renders the corresponding page. Thus, when the client pressure profile specifies "Landscape, both hands, small hands", the web server identifies the corresponding server pressure profile, and from FIG. 11 knows to render Page A Version 5. In other implementations, there may not be information in the client pressure profile that directly identifies a corresponding server pressure profile, and the web server may have to do some additional work to determine the correspondence between the client pressure profile and the corresponding server pressure profile. The disclosure and claims herein expressly extend to any suitable correspondence between client pressure profiles and server pressure profiles, and to any suitable method for identifying the correspondence between these.

FIG. 12 shows another table 1210 that defines which web pages correspond to the defined server pressure profiles. We assume the server pressure profiles in FIG. 12 are the same as defined in FIG. 11. Note, however, the web pages are the same regardless of the size of the user's hands. Thus, Page B Version 1 corresponds to Portrait, Right Hand, Small Hand and also corresponds to Portrait, Right Hand, Large Hand. Similarly, Page B Version 2 corresponds to Portrait, Left Hand, Small Hand and also corresponds to Portrait, Left Hand, Large Hand. Page B Version 3 corresponds to Landscape, Both Hands, Small Hands and Landscape, Both Hands, Large Hands. We see from this example there may be one web page that corresponds to multiple server pressure profiles.

Figure 13:
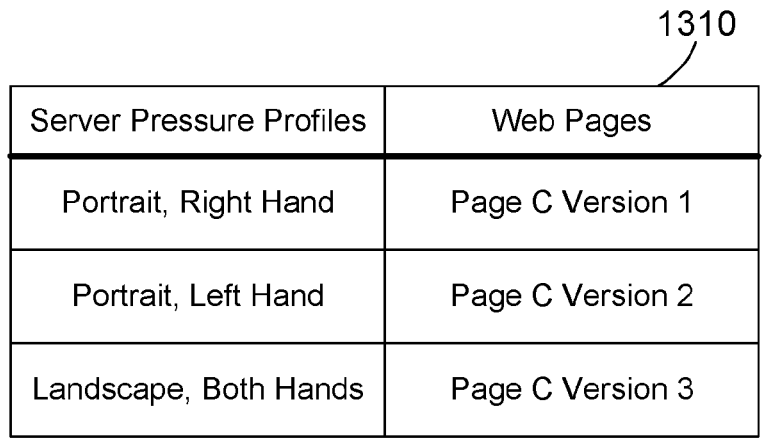
FIG. 13 is a table that shows a third example of web page versions that correspond to server pressure profiles.

FIG. 13 shows another table 1310 that defines which web pages correspond to the defined server pressure profiles. In this example, we assume only three server pressure profiles are defined, namely: 1) Portrait, Right Hand; 2) Portrait, Left Hand; and 3) Landscape, Both Hands, as shown in the left column in table 1310 in FIG. 13. Each server pressure profile identifies a different version of page C, as shown in the right column in table 1310 in FIG. 13.

Figure 14:
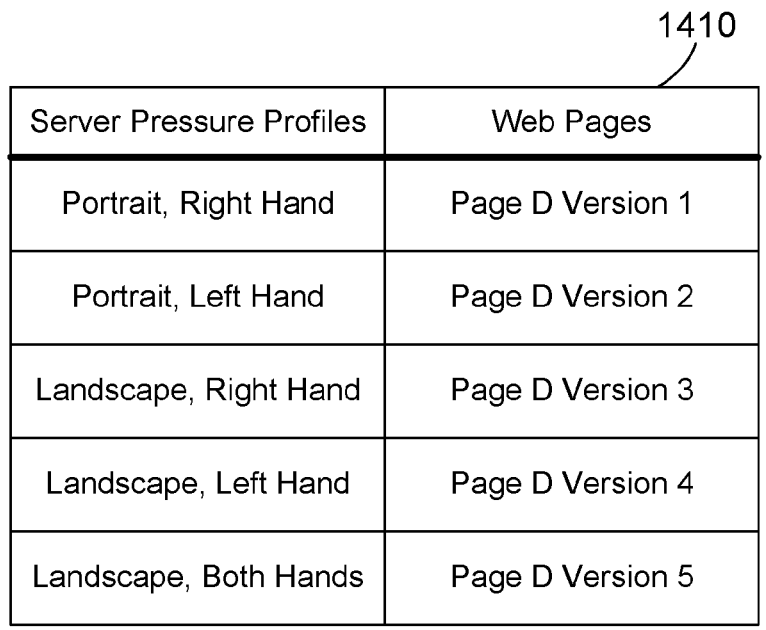
FIG. 14 is a table that shows a fourth example of web page versions that correspond to server pressure profiles.

FIG. 14 shows another table 1410 that defines which web pages correspond to the defined server pressure profiles. In this example, we assume five server pressure profiles are defined, as shown in the left column in table 1410 in FIG. 14. Each server pressure profile identifies a different version of page D, as shown in the right column in table 1410 in FIG. 14.

While specific server pressure profiles are shown in FIGS. 11-14, these are shown by way of example, and are not intended to be limiting. The disclosure and claims herein extend to any suitable number and type of server pressure profiles.

The different versions of web pages in FIGS. 11-14 are preferably different by locating features of a web page in different locations depending on the received client pressure profile. For example, selectable items, such as icons and links, could be placed to be within preferred regions, such as the shaded regions in FIGS. 7 and 8. In another example, selectable items could be placed to be near the edges of a display when the client pressure profile indicates the device is a tablet computer. The result is a web server that can render different versions of a web page to a web client based on the client pressure profile for the web client. This results in the web server rendering to the web client a page that is better suited to the user.

A web server includes a pressure-sensitive page rendering mechanism that renders web pages that have one or more selectable inputs according to a client pressure profile corresponding to the user who requested the web page from the web server. When the web server receives the request from the client, the web server may dynamically generate and render a web page that satisfies the client pressure profile by placing one or more selectable inputs on the web page in one or more preferred regions of the touch screen display. In the alternative, the web server may have multiple versions of a web page that correspond to multiple different server pressure profiles. When a user requests a web page using a device that has a pressure-sensitive touch screen display, the web server analyzes the client pressure profile, identifies a server pressure profile that corresponds to the client pressure profile, identifies a web page that corresponds to the identified server pressure profile, then renders the web page to the user's device. In this manner, the best version of a web page can be rendered to the user's device based on the client pressure profile.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer system comprising:
   at least one processor;
   a memory coupled to the at least one processor; and
   a web server mechanism residing in the memory and executed by the at least one processor, the web server mechanism rendering a plurality of web pages to client devices that each includes a pressure-sensitive interface that is capable of detecting a plurality of pressures when a user touches a displayed pressure-sensitive input on a touch screen display on the client device and interpreting each of the plurality of pressures as a different action with respect to the displayed pressure-sensitive input, wherein the web server mechanism receives a request for a requested web page from a selected client device, receives from the selected client device a client pressure profile corresponding to a user of the selected client device, the client pressure profile including a pressure map that includes a plurality of pressure detection thresholds for a plurality of regions on the touch screen display on the client device, wherein the web server mechanism comprises:
   a plurality of web pages residing in the memory that each comprises a version of a selected web page;
   a plurality of server pressure profiles residing in the memory, wherein each of the plurality of server pressure profiles corresponds to a hand of the user and a screen orientation of the selected client device and further corresponds to one of the plurality of web pages; and
   wherein the web server mechanism, in response to receiving the page request from the selected client device with the client pressure profile corresponding to the user that specifies a current orientation of the selected client device, identifies one of the plurality of server pressure profiles that corresponds to the client pressure profile, identifies one of the plurality of web pages as corresponding to the one identified server pressure profile, and renders to the selected client device the one web page.

2. The computer system of claim 1 wherein the client pressure profile comprises an indication of whether an operating system on the selected client device supports pressure-sensitive inputs.

3. The computer system of claim 1 wherein the client pressure profile comprises a screen size of the selected client device and a current screen orientation of the selected client device.

4. The computer system of claim 3 wherein the client pressure profile indicates at least one preferred screen region of the selected client device with the selected client device in the current screen orientation.

5. The computer system of claim 4 wherein the web page rendered to the selected client device by the web server comprises a web page with at least one selectable input located in the at least one preferred screen region of the selected client device.

6. The computer system of claim 1 wherein the web page rendering mechanism dynamically generates the rendered web page to satisfy the client pressure profile.

7. A method for a web server computer system to render web pages to an electronic device, the method comprising:
   generating a plurality of web pages that each comprises a version of a selected web page;
   generating a plurality of server pressure profiles, wherein each of the plurality of server pressure profiles corresponds to a hand of a user and a screen orientation and further corresponds to one of the plurality of web pages;

receiving a request for a requested web page from a selected client device that includes a pressure-sensitive interface on a touch screen display, wherein the pressure-sensitive interface is capable of detecting a plurality of pressures when a user touches a displayed pressure-sensitive input on a touch screen display on the client device and interpreting each of the plurality of pressures as a different action with respect to the displayed pressure-sensitive input;

receiving from the selected client device a client pressure profile corresponding to a user of the selected client device, the client pressure profile specifying a current orientation of the selected client device and further including a pressure map that includes a plurality of pressure detection thresholds for a plurality of regions on the touch screen display on the client device;

in response to receiving the request for the requested web page from the selected client device and receiving the client pressure profile:

identifying one of the plurality of server pressure profiles that corresponds to the client pressure profile;

identifying one of the plurality of web pages that corresponds to the identified one server pressure profile; and rendering to the selected client device the one web page.

8. The method of claim 7 wherein the client pressure profile comprises an indication of whether an operating system on the selected client device supports pressure-sensitive inputs.

9. The method of claim 7 wherein the client pressure profile comprises a screen size of the selected client device and a current screen orientation of the selected client device.

10. The method of claim 9 wherein the client pressure profile indicates at least one preferred screen region of the selected client device with the selected client device in the current screen orientation.

11. The method of claim 10 wherein the web page rendered to the selected client device comprises a web page with at least one selectable input located in the at least one preferred screen region of the selected client device.

12. The method of claim 7 further comprising dynamically generating the rendered web page to satisfy the client pressure profile.

13. An article of manufacture comprising software stored on a computer readable storage medium, the software comprising:

a web server mechanism that renders a plurality of web pages to client devices that each includes a pressure-sensitive interface that is capable of detecting a plurality of pressures when a user touches a displayed pressure-sensitive input on a touch screen display on the client device and interpreting each of the plurality of pressures as a different action with respect to the displayed pressure-sensitive input, wherein the web server mechanism receives a request for a requested web page from a selected client device, receives from the selected client device a client pressure profile corresponding to a user of the selected client device, the client pressure profile including a pressure map that includes a plurality of pressure detection thresholds for a plurality of regions on the touch screen display on the client device, wherein the web server mechanism comprises:

a plurality of web pages that each comprises a version of a selected web page;

a plurality of server pressure profiles, wherein each of the plurality of server pressure profiles corresponds to a hand of the user and a screen orientation of the selected client device and further corresponds to one of the plurality of web pages; and wherein the web server mechanism, in response to receiving the page request from the selected client device with the client pressure profile corresponding to the user that specifies a current hand and orientation of the selected client device, identifies one of the plurality of server pressure profiles that corresponds to the client pressure profile, identifies one of the plurality of web pages as corresponding to the one identified server pressure profile, and renders to the selected client device the one web page.

14. The article of manufacture of claim 13 wherein the client pressure profile comprises an indication of whether an operating system on the selected client device supports pressure-sensitive inputs.

15. The article of manufacture of claim 13 wherein the client pressure profile comprises a screen size of the selected client device and a current screen orientation of the selected client device.

16. The article of manufacture of claim 15 wherein the client pressure profile indicates at least one preferred screen region of the selected client device with the selected client device in the current screen orientation.

17. The article of manufacture of claim 16 wherein the web page rendered to the selected client device by the web server mechanism comprises a web page with at least one selectable input located in the at least one preferred screen region of the selected client device.

18. The article of manufacture of claim 13 wherein the web page rendering mechanism dynamically generates the rendered web page to satisfy the client pressure profile.

19. A computer system comprising:
at least one processor;
a memory coupled to the at least one processor;
a plurality of web pages residing in the memory that each comprises a version of a selected web page;
a plurality of server pressure profiles residing in the memory, wherein each of the plurality of server pressure profiles corresponds to one of the plurality of web pages, wherein the plurality of server pressure profiles comprises:
portrait orientation, right hand;
portrait orientation, left hand;
landscape orientation, both hands;
wherein the plurality of web pages comprises:
a first version of the selected web page corresponding to the portrait orientation, right hand server pressure profile;
a second version of the selected web page corresponding to the portrait orientation, left hand server pressure profile; and
a third version of the selected web page corresponding to the landscape orientation, both hands server pressure profile, where each of the first, second and third versions of the selected web page are different;
a web server mechanism residing in the memory and executed by the at least one processor, the web server mechanism rendering a plurality of web pages to client devices that each includes a pressure-sensitive interface that can detect a plurality of pressures when a user touches a displayed pressure-sensitive input on a touch screen display on the client device and interpreting each of the plurality of pressures as a different action with respect to the displayed pressure-sensitive input, wherein the web server mechanism:
receives a request for a requested web page from a selected client device;
receives from the selected client device a client pressure profile corresponding to a user of the selected client device, the client pressure profile comprising:
an indication of whether an operating system on the selected client device supports pressure-sensitive inputs;
a screen size of the selected client device;
a current screen orientation of the selected client device; and
at least one preferred screen region of the selected client device with the selected client device in the current screen orientation;
identifies at least one of the plurality of server pressure profiles that corresponds to the client pressure profile; and
renders to the selected client device the first version of the selected web page when the identified server pressure profile is the portrait orientation, right hand server pressure profile, renders to the selected client device the second version of the selected web page when the identified server pressure profile is the portrait orientation, left hand server pressure profile, and renders to the selected client device the third version of the selected web page when the identified server pressure profile is the landscape orientation, both hands server pressure profile.

* * * * *